Jan. 29, 1946.  W. P. LEAR  2,393,644
DIRECTION FINDING SYSTEM
Filed July 24, 1943
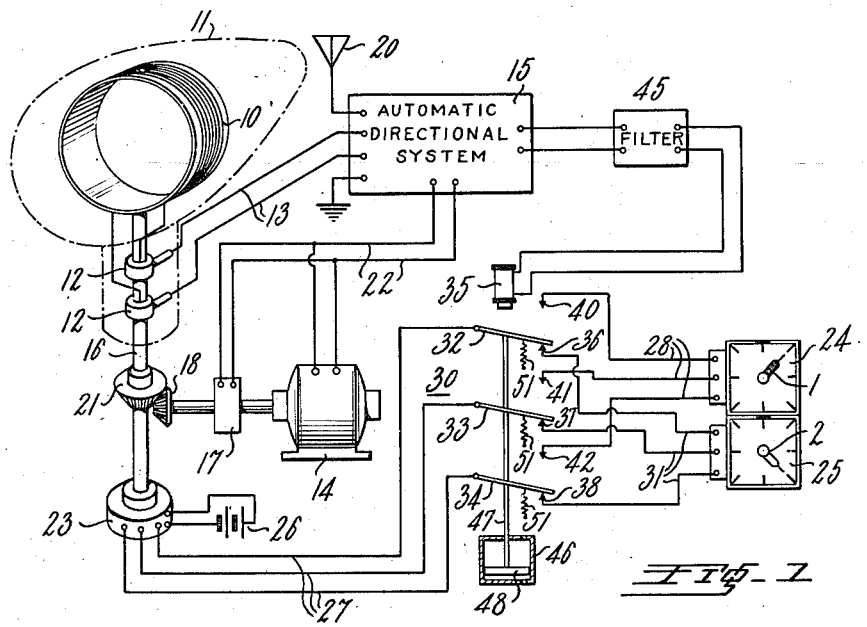
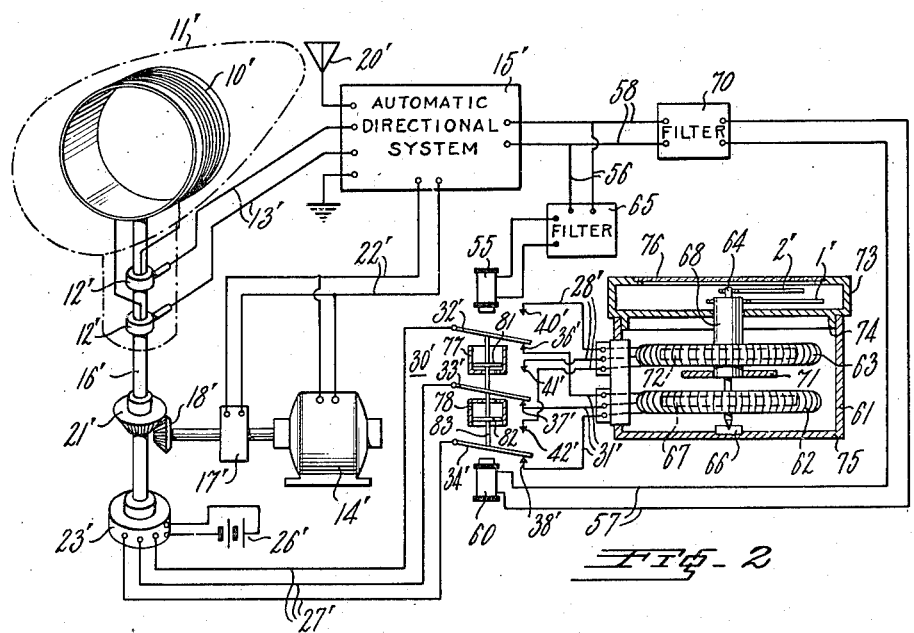
INVENTOR.
WILLIAM P. LEAR
BY
ATTORNEY Patented Jan. 29, 1946

2,393,644

UNITED STATES PATENT OFFICE 2,393,644

DIRECTION FINDING SYSTEM

William P. Lear, North Hollywood, Calif., assignor, by mesne assignments, to Lear, Incorporated, Piqua, Ohio, a corporation of Illinois Application July 24, 1943, Serial No. 495,977

16 Claims. (Cl. 250—11)

This invention relates to radio direction finding systems for mobile craft and more particularly relates to novel instrument approach radio receiver systems and methods for guiding an aircraft to a landing runway, and the like. This case is a continuation in part of my copending application entitled "Radio guidance system," Serial No. 291,807, filed August 25, 1939, which is assigned to the same assignee as is this case.

The instrument approach system of the present invention is designed to continuously indicate to the pilot his exact relative lateral position with respect to the airport in general, and his exact position with respect to the approach path to the runway. The receiver system of my invention operates in conjunction with two spaced non-directional transmitters which are placed in line with the desired runway. The two transmitter stations have the same carrier frequency and their signals are differentiated by tone modulations. The radiations of the two transmitters are successively switched on and off at predetermined intervals.

The directional receiver system of my invention is simultaneously tuned to both transmitters and has two needle indicators arranged to continuously and independently point out the direction to each of the transmitters. The pilot is thus continually made aware of his position. The two indicator needles of the receiver are in line with a center-zero index when the pilot is on-course with the runway. As he passes over the outer transmitter, the "out" indicator needle reverses by 180°. This serves as a marker indication to apprise him of his exact distance from the edge of the runway. As the pilot continues on-course to the runway, the second or "in" needle will reverse by 180° when he passes over the inner transmitter station. No separate marker beacons are thus necessary.

In accordance with the invention I provide a receiver installation which is essentially an automatic 360° radio directional indicator or compass having a directional antenna and two indicators arranged for intermittent connection to the antenna during the approach operations in response to predetermined field transmitter tone signals. The radiation of either one or both transmitters which is received by the receiver system of the invention, may be tone modulated. A relay unit is controlled by the tone signals radiated by one of the transmitters. This relay unit, in turn, operates switches for successively and alternately connecting the two indicators to the position transmitter of the directional antenna to indicate the directional bearing of the transmitter to which each indicator is responsive. If both transmitters generate individual audio frequency modulated signals, two relays are employed for positively operating the indicator switches. One of the relays is energized at a time in response to the received tone signals of its associated field transmitter.

It is accordingly an object of my present invention to provide a novel lateral position radio indication method and system comprising two separate directional indicators.

Another object of the invention is to provide a novel radio lateral position indicator system continuously effective in apprising the pilot of his exact relative position with respect to two spaced transmitter stations.

Still another object of the invention is to provide a novel direction finding system for indicating the lateral position of a mobile craft with respect to two spaced radio transmitters and comprising a single directional antenna and radio receiver.

These and further objects of my present invention will become apparent in the following description of exemplifications thereof shown in the accompanying drawing, in which:

Fig. 1 is a schematic diagram illustrating one form which the directional receiver system of the invention may assume in practice.

Fig. 2 is a schematic diagram of another form which the directional receiver system may assume in practice, comprising two relays and a dual position indicator unit.

Referring to the drawing, and more particularly to Fig. 1, the direction finding receiver system shown here is responsive to radio signals from two transmitters both having the same carrier frequency. The radio signals from one of the two transmitters are distinguished by an audio frequency tone. The two transmitters which are used in connection with the direction finding receiver system of the invention are preferably spaced apart and aligned with a landing runway chosen for the landing of the aircraft.

In the form of the invention illustrated in Fig. 1, a single loop antenna 10 is used in conjunction with a single automatic directional receiver unit 15 and non-directional antenna 20. Directional receiver unit 15 is tuned to the carrier frequency chosen for the two field transmitters. One of the two transmitters is modulated with an audio frequency of, for example, 75 cycles, or 150 or 300 cycles. With the receiver system of the present invention the two field transmitters preferably are made to radiate alternately for a period of one-third to one-half of a second.

Loop antenna 10 preferably is mounted outside the structure of the aircraft for most efficient signal pick-up, and advantageously may be enclosed in a streamline housing indicated in dotted lines at 11 to minimize the aerodynamic resistance thereof during flight. The terminal leads of directional antenna 10 are connected to slip rings 12, 12, which in turn are connected to the automatic receiver unit 15 by leads 13. Control motor 14 for antenna 10 is connected to loop shaft 16 through electromagnetic clutch 17 and gearing 18, 21. Clutch 17 and motor 14 are electrically connected in parallel to the proper motor control section of automatic receiver 15 by leads 22. Upon deenergization of motor 14, electromagnetic clutch 17 instantaneously disconnects motor 14 from shaft 16 to prevent hunting or overshooting of antenna 10. A practical design for the automatic directional receiver unit 15 is described in detail in my copending application, Serial No. 291,807, and in my Patent No. 2,308,521, issued January 19, 1943. A preferred form of electromagnetic clutch is described in detail in my Patent No. 2,267,114, issued December 23, 1941, assigned to the same assignee as this case.

An electrical telemetering arrangement employing loop antenna position transmitter 23 coupled to shaft 16 is provided in conjunction with a remote dual indicator arrangement comprising separate indicators 24, 25. The preferred telemetering arrangement is the direct current "Selsyn" type energized through battery 26, although other types may equally well be used. Three-wire leads 27 connect loop position transmitter 23 to either of the remote indicators 24 or 25 through a relay unit 30. Three-wire leads 28 and 31 connect indicator units 24 and 25, respectively, to relay unit 30.

The relay unit comprises relay armatures 32, 33 and 34 actuated by relay solenoid 35. In the indicated position, indicator unit 25 is connected to cable 27 and position transmitter 23 through back contacts 36, 37 and 38 of relay unit 30. When relay solenoid 35 is energized, indicator unit 25 is disconnected from transmitter 23, and indicator unit 24 is connected thereto through front contacts 40, 41 and 42 of the relay unit 30. Relay solenoid 35 is connected to the automatic receiver unit 15 through pass-filter 45. Solenoid 35 is energized by the transmitted modulated tone, say 75 cycles. A preferred arrangement for the actuation of solenoid 35 is such that the solenoid is normally not energized, connecting indicator unit 25 to position transmitter 23. Upon reception of a radio signal modulated by a substantial 75 cycle (or other predetermined frequency) tone signal, solenoid 35 is arranged to be energized to switch position transmitter 23 from indicator unit 25 to indicator unit 24.

Solenoid 35 thus is selectively energized and deenergized in accordance with the reception of the modulating tone signal from either of the two transmitter stations at the landing field. Indicator unit 24 contains needle 1, corresponding to one of the field transmitters, and indicator unit 25 contains needle 2 corresponding to the other transmitter.

The principle of the form of the invention illustrated in Fig. 1 is the selective connection of each of the two position indicators to the position transmitter of a single directional antenna system controlled by a single automatic directional receiver, in accordance with the reception of a relay signal from the successively operated transmitters at the landing field. The indicators 24 and 25 are designed with sufficient damping that, upon disconnection of either one from the circuit of loop position transmitter 23, its needle 1 or 2 remains in its operated position until the indicator is reconnected to the position transmitter. As the needles 1 and 2 hold their bearing indications, substantially continuous position indications are provided.

In practice, antenna 10 may be rapidly moved, say at the rate of 150° per second, by motor 16 to the null point with respect to the direction of the oncoming waves from one of the transmitter stations. Only one of the two stations is transmitting at one time, and the automatic receiver 15 is tuned to their common radio carrier frequency. Motor 14 will be energized whenever antenna 10 is not at the null signal position with respect to the field station transmitting. The movement of antenna 10 to its directional position with respect to one or the other of the two stations is sufficiently rapid that it assumes the stable null signal position well within the period of transmission of the stations, say one-third or one-half of a second.

When indicator 24, corresponding to the "in" transmitter station, is connected to position transmitter 23, its needle 1 is immediately moved to the position on the scale corresponding to the orientation of the mechanism within the loop position transmitter 23 caused by the transmission of that station. In the drawing indicator 25, having needle 2, is shown connected to loop position transmitter 23. Needle 2 points out the direction to the second or "out" station upon its indicated connection, since loop antenna 10 is moved to a stable on-course position with respect to the second station before that station ceases its transmission interval and the connection of meter 25 to position transmitter 23 is effected prior to that time. Needle 2 then remains stationary on the scale of indicator 25, providing a continuous bearing on the "out" transmitter.

When the second or "out" station ceases transmitting and the first or "in" station starts transmitting, directional receiver 15, tuned to their common frequency, distinguishes between these two stations by the predetermined relay tone modulation of one of them. The predetermined tone, say 75 cycles, is selectively passed by filter 45 to energize relay 35 and operate relay armatures 32, 33 and 34 to their front contacts 40, 41 and 42, respectively. This disconnects indicator 25 from position transmitter 23 and connects indicator 24 thereto instead. The action of the electrical telemetering arrangement herein described is similar to the action of the direct current "Selsyn" transmitter as described in my said Patent No. 2,308,521, particularly in connection with Fig. 10 thereof. Needle 1 assumes the angular position corresponding to the position of the rotatable mechanism within position transmitter 23, in turn corresponding accurately to the angular position of loop antenna 10. Needle 1 retains this position, thus giving a continuous bearing on the "in" transmitter station.

The action of relay armatures 32, 33 and 34 is slowed or otherwise damped in any suitable manner so that connection of position transmitter 23 to either indicator 24 or 25 is materially delayed. A suitable delay is about half the station transmission interval. In other words, the movement of relay armatures 32, 33 and 34 from one set of contacts to the other, is made to consume about half the time of the whole switching interval. To this end I prefer to utilize a double acting dash-pot 46 connected with relay armatures 32, 33 and 34 by rod 47. Dash-pot 46 houses piston 48 which retards the movement of rod 47, and hence of relay armatures 32, 33 and 34, in either direction. Springs 51 connected to relay armatures 32, 33 and 34 urge the armatures downwards against the attracting force of solenoid 45. Thus, the relay armatures remain on one or the other set of the relay contacts for a time interval corresponding to about half or less of the period of transmission of the two transmitter stations. In the case where the stations transmit each for one-third of a second, relay armatures 32, 33 and 34 are made to take one-sixth of a second or less to move from one set of relay contacts to the other.

It is to be understood that the damping action produced by dash-pot 46 on the relay armatures may be designed to consume more or less than such amount. The advantage due to the delay in indicator connection is to reduce unnecessary movements of indicator needles 1 and 2, thus providing substantially continuous bearing indications. Thus, the directional positioning of loop antenna 10 relative to the field station transmitters is effected without unduly disturbing the positions of needles 1 and 2 from their "at rest" indications. The delayed action on the relay armatures connects the proper indicator in circuit when antenna 10 has been moved practically to its new stable bearing position with respect to the corresponding transmitter station. As soon as either indicator is connected to loop position transmitter 23, it quickly indicates the angular position of loop 10.

When the station tuned-in ceases transmitting, the signals from the other station condition solenoid 35 to change the position of relay armatures 32, 33 and 34. Connection of indicator 24 or 25 to unit 23 is thereupon immediately broken and its corresponding reading is "frozen." Due to the damping action of dash-pot 46, the relay armatures are slowly moved into the opposite position. Automatic receiver 15, however, in the meantime quickly energizes loop motor 14 in the manner described in my copending application Serial No. 291,807, to reorient antenna 10 so that the antenna is quickly moved to the directional position bearing on the field station transmitting, preferably within about half the time of the transmission interval. When the loop reorientation is about completed, the corresponding indicator is connected to position transmitter 23 through the action of armatures 32, 33 and 34 delayed by virtue of dash-pot 46, and the needle thereof quickly changes its previously "frozen" position to the angular position corresponding to the new bearing of antenna 10 on the then transmitting field station. The described action is repeated for the next transmission interval.

A modified arrangement of the receiver system is ilustrated in Fig. 2. The system of Fig. 2 is responsive to radio signals generated by two separate transmitter stations with both signals being audio frequency modulated. Both transmitters have the same carrier frequency. The arrangement in Fig. 2 also incorporates a dual indicator replacing the indicators 24 and 25 of Fig. 1. As a number of elements in Fig. 2 are the same in Fig. 1, like reference characters primed have been used to designate the same or corresponding parts.

As in Fig. 1, the receiver system of Fig. 2 comprises a directional antenna 10', an automatic directional system 15' and a nondirectional antenna 20'. Antenna 10' is provided with connections to rings 12', 12', connected through leads 13' to automatic directional system 15'. A motor 14' is operative to rotate antenna shaft 16' through an electromagnetic clutch 17' and gearing 18', 21'. An antenna position transmitter 23' is provided, and is connected to a relay unit 30' through leads 27'. Transmitter 23' is connected to a source of current such as a battery 26'.

The relay unit 30' comprises solenoids 55 and 60. Solenoid 55 is connected to the output of automatic directional system 15' through filter 65 and leads 56. Leads 57 connect solenoid 60 to filter 70 which is connected to automatic directional system 15' through leads 58. Filter 65 is designed to efficiently pass the modulated tone signal radiated by one of the two transmitters to energize solenoid 55 to move relay armatures 32', 33' and 34' into engagement with upper contacts 40', 41' and 42'. Similarly, pass filter 70 is designed to efficiently pass the relay tone signal radiated by the other transmitter to energize solenoid 60. Such energization attracts the relay armatures to the position shown in the drawing, in which they are in engagement with back contacts 36', 37' and 38'. Each set of relay contacts is connected to one element of a dual indicator 75.

Dual indicator 75 includes a housing 61 enclosing direct current Selsyn movements for both needles 1' and 2'. These movements have corresponding torroidal or annular actuating coils 62 and 63. Coil 62 is connected by leads 31' to the back contacts of the relay unit 30'. Coil 63 is connected by leads 28' to the front contacts of relay unit 30'. Needle 2' is connected to a central spindle 64 pivoted in a bearing 66. A magnetic core 67, shown in dotted lines is secured to spindle 64 and arranged to coact magnetically with winding 62 in the usual manner of such telemetering arrangements.

Indicator needle 1' is secured to a sleeve 68 which surrounds spindle 64 and has a bearing in an intermediate member 71. A magnetic core 72 is secured to sleeve 68 and arranged to coact magnetically with winding 63 in the usual manner of such telemetering arrangements. It will be noted that needles 1' and 2' are coaxially arranged but independently rotatable. A casing 73 is provided with a flange 74 fitting within housing 61. A window 76 of transparent material is secured in casing 73 and contains the scale for the indications of the needles.

The operation of this system is essentially the same as that disclosed in Fig. 1. When the transmitter having a tone modulation to which filter 70 is responsive is transmitting, solenoid 60 is energized to move the relay armatures 32', 33' and 34' into engagement with the back contacts of the relay unit 30'. Winding 62 is thus connected to the transmitting unit 23' and needle 2' is moved to indicate the directional bearing of antenna 10' on the transmitting station. Needle 2' retains its position to give a continuous indication on the transmitter station. After a predetermined interval which may be from one-third to one-half a second, the other transmitter station starts to radiate. Its tone modulation is designed to pass filter 65 and thus energize solenoid 55 to move the relay armatures to a position engaging the front contacts of the relay unit. Coil 63 is thus connected to the telemetering transmitter 23' and needle 1' is thereby moved to indicate the directional bearing of antenna 10' with respect to such second transmitter.

As in Fig. 1, it is desirable that the coils 62 and 63 be connected to transmitter 23' only when antenna 10' has substantially completed its orienting movement with respect to the transmitter then radiating. For this purpose, dash-pots 77 and 78 are provided, each having pistons 81 and 82, respectively. Pistons 81 and 82 are connected to rod 83 which in turn is connected to each of the relay armatures. The dash-pots are so designed as to be effective to delay the movement of relay armatures 32', 33' and 34' from one position to the other for a period of about half the transmitting time of the radio transmitters. Thus, dash-pot 77 will retard the movement of the relay armatures from their upper position to the lower position, and dash-pot 78 will retard the movement of the armatures from the lower position to the upper position.

The system illustrated in Fig. 2 has an advantage in that the relay armatures are moved positively to connect either indicating needle 1' or indicating needle 2' with the loop position transmitter 23'. Furthermore, the dual indicator 75 permits easier observation of the relatively angular displacement of needles 1' and 2'. This is so because the needles are coaxially arranged and viewed against the same scale.

While specific embodiments of the invention have been described to illustrate the application of the principles thereof, it will be obvious that the invention may be otherwise embodied without departing from such principles.

I claim:

1. The method of laterally guiding a mobile craft with respect to a predetermined path which comprises successively transmitting radio signals of substantially the same frequency at predetermined intervals from two points spaced along the path by predetermined amounts, directionally receiving the radio signals aboard the craft, deriving an accurate directional bearing on each of the radio signals during the transmission intervals and maintaining the derived bearings during the intervals of non-transmission of the corresponding radio signals.

2. The method of laterally guiding an aircraft with respect to a predetermined path of approach to a runway which comprises successively transmitting radio signals at predetermined intervals from two points spaced along the path, deriving individual directional bearings on each of the radio signals with respect to the position of the aircraft during their respective transmission intervals and maintaining the derived bearings during the intervals of non-transmission of the corresponding radio signals.

3. The method of laterally guiding an aircraft with respect to a predetermined path of approach to a runway which comprises successively transmitting radio signals of substantially the same frequency at predetermined substantially equal intervals from two points spaced along the path, directionally receiving said radio signals aboard the aircraft, deriving an accurate directional indication on each of the radio signals during the transmission intervals and individually maintaining the derived indications during the intervals of non-transmission of the corresponding radio signals.

4. The method of laterally guiding a mobile craft with respect to a predetermined path which comprises successively transmitting radio signals of the same frequency at predetermined substantially equal intervals from two points spaced along the path by predetermined amounts, modulating one of the radio signals with a distinguishing audio frequency note, directionally receiving said radio signals aboard the craft, deriving a directional bearing on each of the radio signals with respect to the position of the craft during their respective transmission intervals, and maintaining the derived bearings during the respective intervals of non-transmission.

5. A radio directional receiving system comprising a rotatable directional antenna; a receiver unit for automatically orienting said directional antenna to bearing positions with respect to received radio signals; a position transmitter connected with said directional antenna for telemetering its orientation; two position indicators arranged for individual connection with said position transmitter; and means responsive to successively received radio signals for correspondingly successively connecting said position indicators with said position transmitter for obtaining individual bearing indications on the separately received radio signals.

6. A radio directional receiving system comprising a rotatable directional antenna; a receiver unit for automatically orienting said directional antenna to bearing positions with respect to received radio signals; a position transmitter connected with said directional antenna for telemetering its orientation; two position indicators arranged for individual connection with said position transmitter; and means responsive to successively received radio signals for correspondingly successively connecting one of said position indicators with said position transmitter upon completion of the bearing orientation of said directional antenna with respect to an associated received radio signal and disconnecting said one position indicator upon reorientation of said directional antenna with respect to a different received radio signal, whereby the directional bearing indication on the associated radio signal is maintained on said one indicator.

7. A radio directional receiving system comprising a rotatable directional antenna; a receiver unit operative to orient said antenna with respect to received radio signals; a position transmitter coupled to said antenna and effective to telemeter its orientation; two position indicators arranged to indicate the orientation of said antenna, each position indicator being responsive to a different radio signal; said receiver unit being responsive to each of said different radio signals; a device for selectively connecting each indicator to said position transmitter in response to reception by said antenna of the radio signal to which each indicator is responsive; and mechanism for delaying the connection of each position indicator to said position transmitter until the substantial completion of the orientation of said directional antenna with respect to the received radio signal to which such indicator is responsive.

8. A radio directional receiving system comprising a rotatable directional antenna; a receiver unit operative to orient said antenna with respect to received radio signals; a position transmitter coupled to said antenna and effective to telemeter its orientation; two position indicators arranged to indicate the orientation of said antenna, each position indicator being responsive to a different radio signal; said receiver unit being responsive to each of said different radio signals; and a device comprising a relay unit including two sets of contacts, each set connected to one of said indicators, movable armatures connected to said position transmitter, and selectively operable means for moving said armatures from one set of contacts to the other set for selectively connecting each indicator to said position transmitter in response to reception by said antenna of the radio signal to which each indicator is responsive.

9. A radio directional receiving system comprising a rotatable directional antenna; a receiver unit operative to orient said antenna with respect to received radio signals; a position transmitter coupled to said antenna and effective to telemeter its orientation; two position indicators arranged to indicate the orientaion of said antenna, each position indicator being responsive to a different radio signal; said receiver unit being responsive to each of said different radio signals; a device for selectively connecting each indicator to said position transmitter in response to reception by said antenna of the radio signal to which each indicator is responsive; and mechanism for delaying the connection of each position indicator to said position transmitter until the substantial completion of the orientation of said directional antenna with respect to the received radio signal to which such indicator is responsive.

10. A radio directional receiving system comprising a rotatable directional antenna; a receiver unit operative to orient said antenna with respect to received radio signals; a position transmitter coupled to said antenna and effective to telemeter its orientation; two position indicators arranged to indicate the orientation of said antenna, each position indicator being responsive to a different radio signal; said receiver unit being responsive to each of said different radio signals; a device for selectively connecting each indicator to said position transmitter in response to reception by said antenna of the radio signal to which each indicator is responsive; and mechanism including motion retarding means associated with said device for delaying the connection of each position indicator to said position transmitter until the substantial completion of the orientation of said directional antenna with respect to the received radio signal to which such indicator is responsive.

11. A radio directional receiving system comprising a rotatable directional antenna; a receiver unit operative to orient said antenna with respect to received radio signals; a position transmitter coupled to said antenna and effective to telemeter its orientation; two position indicators arranged to indicate the orientation of said antenna, each position indicator being responsive to a different radio signal; said receiver unit being responsive to each of said different radio signals; a device for selectively connecting each indicator to said position transmitter in response to reception by said antenna of the radio signal to which each indicator is responsive; and mechanism including dash-pot means associated with said device for delaying the connection of each position indicator to said position transmitter until the substantial completion of the orientation of said directional antenna with respect to the received signal to which such indicator is responsive.

12. A radio directional receiving system comprising a rotatable directional antenna; a receiver unit operative to orient said antenna with respect to received radio signals; a position transmitter coupled to said antenna and effective to telemeter its orientation; two position indicators arranged to indicate the orientation of said antenna, each position indicator being responsive to a different radio signal; said receiver unit being responsive to each of said different radio signals; and a device including pass filter means for selectively connecting each indicator to said position transmitter in response to reception by said antenna of the radio signal to which each indicator is responsive.

13. A radio directional receiving system comprising a rotatable directional antenna; a receiver unit operative to orient said antenna with respect to received tone modulated radio signals; a position transmitter coupled to said antenna and effective to telemeter its orientation; two position indicators arranged to indicate the orientation of said antenna, each position indicator being responsive to a different one of such radio signals; said receiver unit being responsive to each of such different radio signals; a device comprising a relay unit including two sets of contacts, each set connected to one of said indicators, movable armatures connected to said position transmitter, and a pair of solenoids for moving said armatures from one set of contacts to the other set, each solenoid being energized in response to reception of one of such different radio signals by said antenna; and a pair of pass filters each connected between one of said solenoids and said receiver unit, each filter passing the tone modulation of one of such radio signals to energize its associated solenoid.

14. A radio directional receiving system comprising a rotatable directional antenna; a receiver unit operative to orient said antenna with respect to received tone modulated radio signals; a position transmitter coupled to said antenna and effective to telemeter its orientation; a dual position indicator including a pair of elements each arranged to indicate the orientation of said antenna, each indicator element being responsive to a different one of such radio signals; said receiver unit being responsive to each of such different radio signals; and a device for selectively connecting each indicator element to said position transmitter in response to reception by said antenna of the radio signal to which each indicator element is responsive.

15. A radio directional receiving system comprising a rotatable directional antenna; a receiver unit operative to orient said antenna with respect to received radio signals; a position transmitter coupled to said antenna and effective to telemeter its orientation; a dual position indicator including a pair of elements each arranged to indicate the orientation of said antenna, each indicator element being responsive to different radio signals; said receiver unit being responsive to each of such different radio signals; and a device for selectively connecting each indicator element to said position transmitter in response to reception by said antenna of the radio signals to which each indicator element is responsive, said device comprising a relay unit including two sets of contacts, each set connected to one of said indicator elements, movable armatures connected to said position transmitter, and selectively operable means for moving said armatures from one set of contacts to the other set.

16. A radio directional receiving system comprising a rotatable directional antenna; a receiver unit operative to orient said antenna with respect to received tone modulated radio signals; a position transmitter coupled to said antenna and effective to telemeter its orientation; a dual position indicator including a pair of elements each arranged to indicate the orientation of said antenna, each indicator element being responsive to a different one of such radio signals; said receiver unit being responsive to each of such different radio signals; a device comprising a relay unit including two sets of contacts, each set connected to one of said indicator elements, movable armatures connected to said position transmitter, and a pair of solenoids for moving said armatures from one set of contacts to the other set, each solenoid being energized in response to reception of one of such different radio signals by said antenna; and a pair of pass filters each connected between one of said solenoids and said receiver unit, each filter passing the tone modulation of one of such radio signals to energize its associated solenoid.

WILLIAM P. LEAR.